(12) United States Patent
Jiang et al.

(10) Patent No.: US 9,062,586 B2
(45) Date of Patent: Jun. 23, 2015

(54) IMPERMEABLE POLYMER COATING ON SELECTED HONEYCOMB CHANNEL SURFACES

(71) Applicant: CORNING INCORPORATED, Corning, NY (US)

(72) Inventors: Dayue David Jiang, Painted Post, NY (US); Steven Bolaji Ogunwumi, Painted Post, NY (US); Zhen Song, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 140 days.

(21) Appl. No.: 13/795,372

(22) Filed: Mar. 12, 2013

(65) Prior Publication Data

US 2014/0271394 A1    Sep. 18, 2014

Related U.S. Application Data (60) Provisional application No. 61/620,673, filed on Apr. 5, 2012.

(51) Int. Cl.
| | | |
|---|---|---|
| *B01D 53/02* | (2006.01) | |
| *F01N 3/28* | (2006.01) | |
| *F01N 13/16* | (2010.01) | |

(52) U.S. Cl.
CPC ............. *F01N 3/2828* (2013.01); *F01N 13/16* (2013.01); *B01D 2253/202* (2013.01); *F01N 2330/20* (2013.01); *F01N 2510/06* (2013.01); *F01N 2570/10* (2013.01)

(58) Field of Classification Search
CPC .............. B01D 53/0415; B01D 2253/102; B01D 46/0036; B01J 35/04; B01J 37/0215
See application file for complete search history.

(56) References Cited

U.S. PATENT DOCUMENTS

| | | | | |
|---|---|---|---|---|
| 4,368,776 A | * | 1/1983 | Negita et al. | ........... 165/133 |
| 4,702,963 A | | 10/1987 | Phillips et al. | ........... 428/426 |

(Continued)

FOREIGN PATENT DOCUMENTS

| | | |
|---|---|---|
| DE | 102007031416 | 1/2008 |
| EP | 0432438 | 6/1991 |

(Continued)

OTHER PUBLICATIONS

International Search Report, dated Jul. 30, 2013, pp. 1-4, International Patent Application No. PCT/US2013/035070, European Patent Office, The Netherlands.

(Continued)

*Primary Examiner* — Amber Orlando
(74) *Attorney, Agent, or Firm* — Michael A Hood (57) ABSTRACT

Absorbent structures for $CO_2$ capture include a honeycomb substrate having partition walls that extend through the honeycomb substrate. The partition walls have channel surfaces that define a plurality of individual channels including a plurality of reaction channels and a plurality of heat-exchange channels. The reaction channels and the heat-exchange channels are arranged such that individual reaction channels are in thermal communication with individual heat-exchange channels. Surfaces of the reaction channels surfaces include a sorbent material, and surfaces of the heat-exchange channels include a coating layer. The coating layer includes a water-impermeable layer formed from a polymer material. The polymer material of the water-impermeable layer does not substantially penetrate into the sorbent material of the partition walls or of the reaction-channel surfaces. Methods for forming the absorbent structures include coating the surfaces of the heat-exchange channels with the polymer material using a liquid composition such as an aqueous polymer emulsion.

21 Claims, 4 Drawing Sheets

(56) References Cited

U.S. PATENT DOCUMENTS

| | | | |
|---|---|---|---|
| 5,006,377 A | 4/1991 | Delcorps et al. | 428/34.7 |
| 6,565,627 B1 | 5/2003 | Golden et al. | 95/96 |
| 6,716,275 B1 | 4/2004 | Reed et al. | 96/10 |
| 6,908,497 B1 * | 6/2005 | Sirwardane | 95/136 |
| 7,135,424 B2 * | 11/2006 | Worley et al. | 442/131 |
| 7,344,770 B2 * | 3/2008 | Hirai et al. | 428/116 |
| 2005/0037147 A1 | 2/2005 | Ogunwumi et al. | 427/393.6 |
| 2005/0061483 A1 | 3/2005 | Dunne et al. | 165/104.12 |
| 2005/0181172 A1 * | 8/2005 | Hirai et al. | 428/116 |
| 2007/0122609 A1 * | 5/2007 | Hiltzik et al. | 428/304.4 |
| 2007/0142208 A1 | 6/2007 | Addiego et al. | 501/109 |
| 2008/0202107 A1 * | 8/2008 | Boorse et al. | 60/301 |
| 2008/0277819 A1 * | 11/2008 | Ichikawa | 264/211.12 |
| 2008/0282888 A1 | 11/2008 | Deckman et al. | 95/126 |
| 2008/0314244 A1 | 12/2008 | Kelley et al. | 95/41 |
| 2009/0000475 A1 | 1/2009 | Fekety et al. | 95/105 |
| 2009/0110873 A1 * | 4/2009 | Jiang et al. | 428/116 |
| 2009/0139193 A1 * | 6/2009 | Garcia et al. | 55/523 |
| 2010/0119747 A1 | 5/2010 | Rockenfeller et al. | 428/36.4 |
| 2010/0212495 A1 * | 8/2010 | Gadkaree et al. | 95/139 |
| 2010/0326272 A1 * | 12/2010 | Asaro et al. | 95/11 |
| 2011/0219802 A1 | 9/2011 | Minhas et al. | 62/238.3 |
| 2011/0268635 A1 * | 11/2011 | Boorse et al. | 423/213.7 |
| 2012/0272823 A1 * | 11/2012 | Halder et al. | 95/139 |

FOREIGN PATENT DOCUMENTS

| | | | |
|---|---|---|---|
| EP | 0700718 | 3/1996 | |
| EP | 2098285 | 9/2009 | B01J 10/02 |
| JP | 1993309358 | 11/1993 | |
| WO | WO2008/143826 | 11/2008 | B01D 53/04 |
| WO | WO2008/143966 | 11/2008 | B01D 53/04 |
| WO | WO2008/143968 | 11/2008 | B01D 53/04 |
| WO | WO2010/024935 | 3/2010 | B01J 10/02 |
| WO | WO2012030557 | 3/2012 | |

OTHER PUBLICATIONS

Written Opinion of the International Searching Authority, dated Jul. 30, 2013, pp. 1-6, International Patent Application No. PCT/US2013/035070, European Patent Office, The Netherlands.

* cited by examiner

IMPERMEABLE POLYMER COATING ON SELECTED HONEYCOMB CHANNEL SURFACES

This application claims the benefit of priority under 35 U.S.C. §119 of U.S. Provisional Application Ser. No. 61/620,673 filed on Apr. 5, 2012 the content of which is relied upon and incorporated herein by reference in its entirety.

BACKGROUND

1. Field

The present specification generally relates to absorbent structures for capturing carbon dioxide ($CO_2$) from a gas stream and, more specifically, to absorbent structures having designated reaction flow channels with sorbent surfaces and designated heat-exchange channels with water-impermeable barrier layers.

2. Technical Background

Carbon dioxide is a greenhouse gas that has been linked to global warming. It is often a by-product of various consumer and industrial processes such as, for example, combustion of fossil fuels, purification of natural gas, and oil recovery systems. From an economic perspective, carbon trading and future regulations of carbon emissions from flue gases and other $CO_2$ point sources encourage the development of $CO_2$ capture technologies.

Carbon-dioxide capture by solid sorbent can be realized by processes such as thermal swing adsorption, pressure swing adsorption, or vacuum swing adsorption. In thermal-swing adsorption processes, for example, $CO_2$ from a process gas is adsorbed onto a solid sorbent at a low temperature and then is desorbed from the sorbent into an exhaust stream by heating the sorbent to a higher temperature. Once the $CO_2$ is desorbed from the sorbent, the sorbent must be cooled again to begin a new adsorption cycle. In large-scale applications involving thermal-swing processes, the need to cycle temperature quickly and uniformly across a large amount of solid sorbent remains a technical challenge.

Accordingly, ongoing needs exist for alternative methods and apparatuses that may be used in thermal-swing adsorption processes to recover $CO_2$ from process-gas streams.

SUMMARY

According to various embodiments, an absorbent structure for $CO_2$ capture is provided. The absorbent structure includes a honeycomb substrate having partition walls that extend through the honeycomb substrate in an axial direction from an inlet surface of the honeycomb substrate to an outlet surface of the honeycomb substrate opposite the inlet surface. The partition walls have channel surfaces that define a plurality of individual channels. The plurality of individual channels include a plurality of reaction channels and a plurality of heat-exchange channels, whereby the channel surfaces of the reaction channels are reaction-channel surfaces and the channel surfaces of the heat-exchange channels are exchange-channel surfaces. The reaction channels and the heat-exchange channels are arranged such that individual reaction channels are in thermal communication with individual heat-exchange channels. The reaction-channel surfaces include a sorbent material, and the exchange-channel surfaces include at least one coating layer. In non-limiting embodiments, the at least one coating layer may include a water-impermeable layer formed from a polymer material such as, for example, poly(vinyl butyral) resins, polyacrylates, polynitriles (including carboxylated-acrylonitrile-co-butadienes), polychloroprenes, poly(vinyl chloride), poly(vinylidene fluoride), polyolefins, poly(tetrafluoroethylene), silicones, polyurethanes, mixtures thereof, and composites thereof. The polymer material of the water-impermeable layer does not substantially penetrate into the partition walls that form the exchange-channel surfaces.

According to further embodiments, methods for forming an absorbent structure for $CO_2$ capture are provided. The methods may include providing a honeycomb substrate formed from a sorbent material. The honeycomb substrate has partition walls that extend through the honeycomb substrate in an axial direction from an inlet surface of the honeycomb substrate to an outlet surface of the honeycomb substrate opposite the inlet surface. The partition walls have channel surfaces that define a plurality of individual channels. The plurality of individual channels include a plurality of reaction channels and a plurality of heat-exchange channels, whereby the channel surfaces of the reaction channels are reaction-channel surfaces and the channel surfaces of the heat-exchange channels are exchange-channel surfaces. The method further may include masking inlet ends and outlet ends of each of the reaction channels to form masked reaction channels. The method further may include delivering an aqueous polymer emulsion (latex, for example) or an aqueous polymer dispersion onto the inlet surface of the honeycomb substrate to cause the aqueous polymer emulsion to flow through each of the heat-exchange channels and not to flow through the masked reaction channels, thereby forming an emulsion coating of the aqueous polymer emulsion over the exchange-channel surfaces only. The method may further include drying the emulsion coating to form a water-impermeable layer on the exchange-channel surfaces. The water-impermeable layer may include a polymer material such as, for example, poly(vinyl butyral) resins, polyacrylates, polynitriles (including carboxylated-acrylonitrile-co-butadienes), polychloroprenes, poly(vinyl chloride), poly(vinylidene fluoride), polyolefins, poly(tetrafluoroethylene), silicones, polyurethanes mixtures thereof, and composites thereof.

According to further embodiments, additional methods for forming an absorbent structure for $CO_2$ capture are provided. The methods may comprise providing a honeycomb substrate formed from a ceramic material. The honeycomb substrate has partition walls that extend through the honeycomb substrate in an axial direction from an inlet surface of the honeycomb substrate to an outlet surface of the honeycomb substrate opposite the inlet surface. The partition walls have channel surfaces that define a plurality of individual channels. The plurality of individual channels include a plurality of reaction channels and a plurality of heat-exchange channels, whereby the channel surfaces of the reaction channels are reaction-channel surfaces and the channel surfaces of the heat-exchange channels are exchange-channel surfaces. The method further may include masking inlet ends and outlet ends of each of the reaction channels to form masked reaction channels. The method further may include delivering an aqueous polymer emulsion onto the inlet surface of the honeycomb substrate to cause the aqueous polymer emulsion to flow through each of the heat-exchange channels and not to flow through the masked reaction channels, thereby forming an emulsion coating of the aqueous polymer emulsion over the exchange-channel surfaces only. The method further may include drying the emulsion coating to form a water-impermeable layer over the exchange-channel surfaces. The water-impermeable layer may include a polymer material such as, for example, poly(vinyl butyral) resins, polyacrylates, polynitriles (including carboxylated-acrylonitrile-co-butadienes), polychloroprenes, poly(vinyl chloride), poly(vinylidene fluoride), polyolefins, poly(tetrafluoroethylene), silicones, polyurethanes mixtures thereof, and composites thereof.

Additional features and advantages of the embodiments described herein will be set forth in the detailed description that follows. These additional features and advantages will be in part readily apparent to those skilled in the art from the written description alone or will be readily recognized by practicing the embodiments described in the written description that follows, including the appended drawings and claims.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
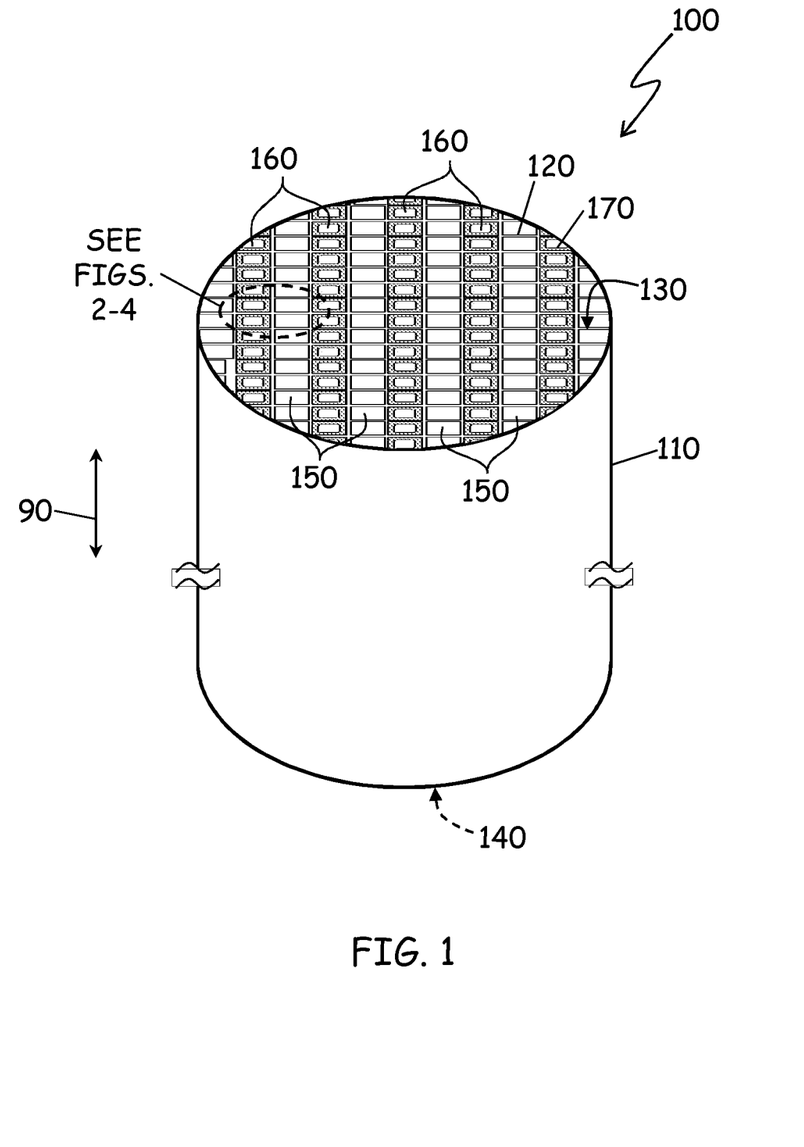
FIG. 1 is a perspective view of an absorbent structure according to embodiments herein, showing a honeycomb substrate with partition walls that define reaction channels and heat-exchange channels.
Figure 2:
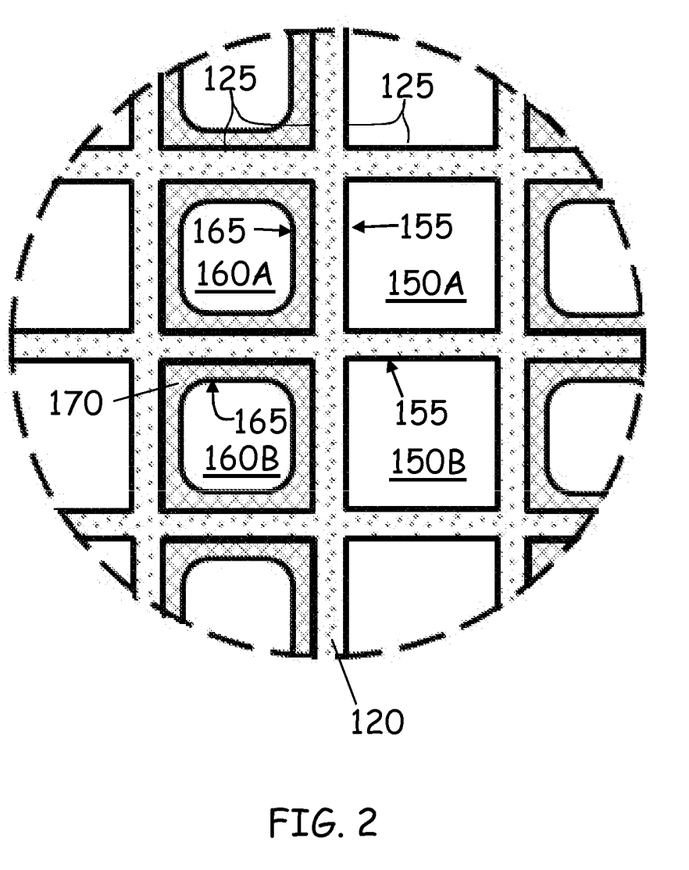
FIG. 2 is a partial view of one embodiment of the absorbent structure of FIG. 1, in which reaction channels are defined by sorbent surfaces of partition walls of a honeycomb substrate, and the heat-exchange channels are coated with a water-impermeable layer.
Figure 3:
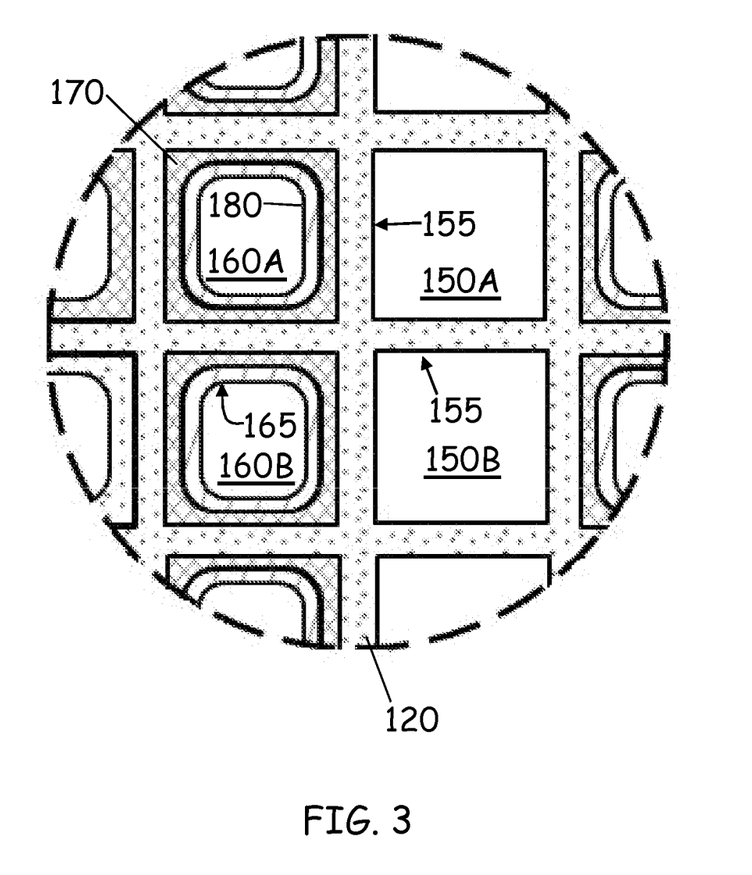
FIG. 3 is a partial view of one embodiment of the absorbent structure of FIG. 1, in which reaction channels are defined by sorbent surfaces of partition walls of a honeycomb substrate, and the heat-exchange channels are coated with a water-impermeable layer and an additional layer overlying the water-impermeable layer

Reference now will be made in detail to embodiments of absorbent structures for capturing $CO_2$ from a gas stream and to methods for forming the same, examples of which are illustrated in the accompanying drawings. Whenever possible, the same reference numerals will be used throughout the drawings to refer to the same or like parts. One embodiment of the absorbent structure for capturing $CO_2$ from a gas stream is schematically depicted in FIG. 1, and additional embodiments are depicted in FIGS. 2 and 3. The absorbent structure generally includes a honeycomb substrate having partition walls that extend through the honeycomb substrate in an axial direction from an inlet surface of the honeycomb substrate to an outlet surface of the honeycomb substrate opposite the inlet surface. The partition walls have channel surfaces that define a plurality of individual channels. The plurality of individual channels include a plurality of reaction channels and a plurality of heat-exchange channels, whereby the channel surfaces of the reaction channels are reaction-channel surfaces and the channel surfaces of the heat-exchange channels are exchange-channel surfaces. The reaction channels and the heat-exchange channels are arranged such that individual reaction channels are in thermal communication with individual heat-exchange channels. The reaction-channel surfaces include a sorbent material, and the exchange-channel surfaces include at least one water-impermeable coating layer formed from a polymer material. The polymer material of the water-impermeable layer does not penetrate from the exchange-channel surfaces into the sorbent material of the reaction-channel surfaces. Thus, in a process for capturing $CO_2$ from a gas stream, the gas stream flows through the reaction channels, and a thermal-transfer medium such as water can flow through the heat-exchange channels, the thermal-transfer medium being blocked by the water-impermeable coating layer from entering into the reaction channels or otherwise decreasing sorbent $CO_2$ loading capacity. The absorbent structure and methods of forming the absorbent structure will be described in more detail herein with specific reference to the appended drawings.

Referring to FIGS. 1 and 2, an absorbent structure 100 for capturing $CO_2$ from a gas stream according to some embodiments may include a honeycomb substrate 110 having partition walls 120 that extend through the honeycomb substrate 110 in an axial direction 90 from an inlet surface 130 of the honeycomb substrate 110 to an outlet surface 140 of the honeycomb substrate 110. The outlet surface 140 is opposite the inlet surface 130. The partition walls 120 have channel surfaces 125 that define a plurality of individual channels 150, 160. The plurality of individual channels 150, 160 include a plurality of reaction channels 150 and a plurality of heat-exchange channels 160. Thus, the channel surfaces 125 of the reaction channels 150 are reaction-channel surfaces 155, and the channel surfaces 125 of the heat-exchange channels 160 are exchange-channel surfaces 165. The reaction channels 150 and the heat-exchange channels 160 are arranged such that individual reaction channels 150A, 150B are in thermal communication with individual heat-exchange channels 160A, 160B. The reaction-channel surfaces 155 include a sorbent material. The exchange-channel surfaces 165 include at least one coating layer overlying the exchange-channel surfaces 165. The at least one coating layer includes a water-impermeable layer 170 formed from a polymer material. The polymer material of the water-impermeable layer 170 does not substantially penetrate into the sorbent material of the partition walls 120 that form the exchange-channel surfaces 165 or into the sorbent material of the reaction-channel surfaces 155.

The honeycomb substrate 110 may be formed from any suitable porous material including, for example, glass, ceramics, non oxide ceramics (e.g., carbides, nitrides), carbon, alloys, metals, polymers, composites, and mixtures thereof. In some embodiments, the honeycomb substrate 110 may be formed from a sorbent material capable of adsorbing $CO_2$ such as, for example, zeolites, MOFs (Metallic Organic frameworks), clays, layered double hydroxides, solid amines and alkaline/alkaline earth oxides or composites containing zeolites MOFs (Metallic Organic frameworks) or cordierite, SiC, mullite, alumina, and aluminum titanate, and carbon. In other embodiments, the honeycomb substrate 110 may be formed from a ceramic support material having a sorbent material embedded therein. In other embodiments, the honeycomb substrate 110 may be formed from a non-sorbent material and subsequently loaded with a sorbent material by a suitable method such as washcoating, for example. The honeycomb substrate 110 may be prepared by any suitable method but typically is prepared by extruding, molding, 3-D printing or forming an appropriate material and, optionally, finishing the material such as, for example, by heating or firing the material.

In general, the sorbent materials according to embodiments described herein are materials capable of reversibly adsorbing $CO_2$ from a process gas stream containing $CO_2$ and one or more additional gases such as methane, nitrogen, hydrogen, hydrogen sulfide, or mixtures thereof. As used herein, "capable of reversibly adsorbing $CO_2$ from a process gas stream" means that the sorbent material can adsorb $CO_2$ from the process gas stream at a first set of operational parameters (for example, an initial temperature) and that the adsorbed $CO_2$ can be made to desorb from the sorbent material by changing to a second set of operational parameters (for example, by raising the temperature). In non-limiting embodiments, the process gas stream containing $CO_2$ may be, for example, natural gas, flue gas, air, biogas, a water gas-shift mixture from a hydrogen gas production process, and exhaust gas from a combustion process. In some embodiments, the honeycomb substrate 110 is formed from a sorbent material or from a non-sorbent material to which the sorbent material is added during formation of the honeycomb substrate 110. In other embodiments, sorbent material is loaded into pores of a honeycomb substrate 110 formed of a non-sorbent material.

According to some embodiments, suitable sorbent materials from which the honeycomb substrate 110 may be prepared (by molding, extrusion, or forming, for example) include, as non-limiting examples, zeolites, carbon, zeolitic imadazole framework, metallic organic framework, carbon, mesoporous alumina and silicas including SBA-15 and analogs, and combinations of the above materials. Particularly suitable sorbent materials for $CO_2$ include, in non-limiting embodiments, zeolites, zeolites, zeolitic imidazole frameworks, metallic organic frameworks, carbon, mesoporous alumina and silicas including SBA-15 and analogs, combinations of the above materials, and any of the above materials functionalized with an amine or amino group. In other embodiments, the honeycomb substrate 110 may be formed from a ceramic support material in which one or more of these sorbent materials may be embedded. In such embodiments, the ceramic support material may be molded or co-extruded together with the sorbent material to form the honeycomb substrate, for example.

According to some embodiments, suitable sorbent materials that may be applied onto at least the reaction-channel surfaces 155 of the honeycomb substrate 110 include, in non-limiting embodiments, zeolites, zeolitic imidazole frameworks, metallic organic frameworks, carbon, mesoporous alumina and silicas including SBA-15 and analogs, combinations of any of the above materials, and any of the above materials functionalized with an amine or an amino group. According to embodiments described herein the sorbent materials may be applied by any suitable technique such as by washcoating, for example.

Though the honeycomb substrate 110 of the embodiment of FIG. 1 is cylindrical, according to other embodiments, the honeycomb substrate 110 may have any desired shape such as a triangular solid, a rectangular solid, a square solid, or a hexagonal solid, for example. Furthermore, the honeycomb substrate 110 may have any suitable length in the axial direction 90, such as from 1 cm to 10 m, for example.

In general, the material from which the honeycomb substrate 110 is formed is porous. In some embodiments the honeycomb substrate 110 may be formed from a sorbent material. In other embodiments the honeycomb substrate may be formed from a non-sorbent material such as a ceramic support, for example, to which sorbent material is added either during formation of the honeycomb substrate 110 (for example, by co-extrusion) or after formation of the honeycomb substrate 110 (for example, by washcoating). The material of the honeycomb substrate 110 in some embodiments may have median pore sizes of from 1.0 µm to 15 µm. In some embodiments, the sorbent material and the honeycomb substrate 110 may have some pores with pore sizes less than 1 µm and some pores with pore sizes greater than 1 µm. For example, the sorbent material and the honeycomb substrate 110 may have pores, of which greater than 50% of the pores have sizes less than 1 µm. As used herein, the term "pore size" refers to a cross sectional diameter or, when pores have non-circular cross-sections, to the diameter of a hypothetical circle having the same cross sectional area as that of the non-circular pore. Generally, pore sizes of any given material exist in a statistical distribution. Thus, the term "median pore size" or "$d_{50}$" refers to a length measurement, above which the pore sizes of 50% of the pores lie and below which the pore sizes of the remaining 50% of the pores lie, based on the statistical distribution of all the pores. It should be understood, however, that the embodiments of the absorbent structure 100 described herein may be utilized on a honeycomb substrate 110 having other median pore sizes including, without limitations, honeycomb substrates with median pore sizes of less than 1.0 µm or greater than 15 µm.

In some embodiments, the honeycomb substrate 110 may have a porosity of from 35% to 60%, as measured by mercury intrusion porosimetry. It should be understood, however, that the embodiments of the absorbent structure 100 described herein may be utilized on a honeycomb substrate 110 having other porosities including, without limitation, honeycomb substrates with porosities less than 35% or greater than 60%.

Though the shapes of the individual channels 150, 160 in the honeycomb substrate 110 of FIGS. 1 and 2 are depicted as square, it should be understood that the shapes of the individual channels in embodiments of the absorbent structure 100 described herein are by no means limited to those depicted in FIGS. 1 and 2. Rather, the individual channels 150, 160 in the honeycomb substrate 110 may have any desirable cross-section including, without limitation, rectangles, squares, circles, ovals, hexagons, triangles, pentagons, regular or irregular polygons having from 3 to 20 sides, and combinations thereof. Preferably, the cross-sections of the individual channels 150, 160 are chosen to maximize the ratio of the cross-sectional area of the individual channels 150, 160 to the cross-sectional area of the honeycomb substrate 110 sliced in a direction perpendicular to the axial direction 90. As such, it should be readily understood that numerous space-filling options are possible such as, for example, tessellations of one or more types of geometrically configured channels. Additionally, it should be understood that the reaction channels 150 and the heat-exchange channels 160 need not be the same shape or size and need not be equal in number in the honeycomb substrate 110. In some embodiments, for example, the reaction channels 150 and the heat-exchange channels 160 may be arranged in rows, such that multiple rows of reaction channels 150 (for example, two, three, four, five, or more than five) are disposed between each row of heat-exchange channels 160.

The individual channels 150, 160 in the honeycomb substrate 110 have a cell density, defined as the number of individual channels 150, 160 present in the honeycomb substrate 110 per square inch of the inlet surface 130. In some embodiments, the honeycomb substrate 110 may have a cell density of from about 100 to about 2000 individual channels per square inch of the inlet surface. In preferred embodiments, the honeycomb substrate 110 may have a cell density of from about 300 to about 1500 individual channels per square inch of the inlet surface 130. In further preferred embodiments, the honeycomb substrate 110 may have a cell density of from about 600 to about 1500 individual channels per square inch of the inlet surface. In general, the cell density of the honeycomb substrate 110 may be chosen to be compatible with the viscosity of an aqueous polymer emulsion used to coat the exchange-channel surfaces 165, as will be described in greater detail below. Thus, in some embodiments, the reaction channels 150 may have cell densities such as from about 100 to about 2000, from about 300 to about 1500, or from about 600 to about 1500 reaction channels 150 per square inch of the inlet surface 130, and the cell density and geometric configuration of the heat-exchange channels 160 interspersed among the reaction channels 150 may be limited only to as far as the cell densities enable adequate coatability of the heat-exchange channels 160 with the at least one coating layer that includes the water-impermeable layer 170.

Referring to FIGS. 1 and 2, as noted above, the reaction channels 150 and the heat-exchange channels 160 are arranged such that individual reaction channels 150A, 150B are in thermal communication with individual heat-exchange channels 160A, 160B. Though it should be understood that numerous configurations of channel geometries and layouts are possible, one example of the thermal communication is illustrated in the embodiment of FIG. 2.

Though there are additional routes of thermal communication that may exist in the embodiment of FIG. 2, the most evident routes are between reaction channel 150A and heat-exchange channel 160A, and also between reaction channel 150B and heat-exchange channel 160B. In both instances, thermal communication between the reaction channels 150A, 150B and the respective heat-exchange channels 160A, 160B occurs directly through the partition wall 120 into an adjacent channel. Thereby, if a thermal-transfer medium or a thermal-transfer fluid such as water, for example, flows through the heat-exchange channels 160A, 160B, the temperature of the reaction channels 150A, 150B can be affected by the temperature of the thermal-transfer medium relative to the temperature of the reaction channels 150A, 150B. For example, if the thermal-transfer medium is colder than the temperature of the reaction channels 150A, 150B, the reaction channels may be cooled, favoring adsorption of $CO_2$. Likewise, if the thermal-transfer medium is warmer than the temperature of the reaction channels 150A, 150B, the reaction channels may be warmed, favoring desorption of $CO_2$. Thus, it should be appreciated that the thermal communication between the reaction channels 150A, 150B and the respective heat-exchange channels 160A, 160B may enable rapid and uniform adjustment of the sorbent material temperature in the absorbent structure 100, such would be required during cycles of thermal-swing adsorption processes.

Exemplary embodiments of the absorbent structure 100 of FIG. 1 will now be described with reference to FIGS. 2 and 3. In all such embodiments, the reaction-channel surfaces 155 include a sorbent material and the exchange-channel surfaces 165 include at least one coating layer. The at least one coating layer on the exchange-channel surfaces 165 includes a water-impermeable layer 170 formed from a polymer material, which will be described in greater detail below. Further, in all embodiments, the polymer material of the water-impermeable layer 170 does not substantially penetrate into the partition walls 120 that form the exchange-channel surfaces 165, the sorbent material of the partition walls 120, or the sorbent material of the reaction-channel surfaces 155. As used herein, the phrase "does not substantially penetrate into" means that, though the water-impermeable layer 170 may penetrate slightly into the partition walls 120, the slight penetration does not block the pores of sorbent material in which adsorption of $CO_2$ must occur during operation of the absorbent structure 100. In no regard does the polymer material of the water-impermeable layer 170 penetrate all the way through the partition walls 120 so as to reach the reaction-channel surfaces 155, thereby potentially rendering at least one face of an individual reaction channel 150A, 150B unable to adsorb $CO_2$. In illustrative embodiments, the polymer material of the water-impermeable layer 170 may penetrate into the sorbent material of the partition walls 120 less than 25%, less than 10%, or less than 5% of the width of the partition walls 120 between adjacent heat-exchange channels 160 and reaction channels 150.

Referring to FIG. 2, a partial view of a honeycomb substrate 110 (see FIG. 1) is depicted. In some embodiments, the honeycomb substrate 110 is formed from a sorbent material, as described above. Thereby, the partition walls 120 composing the reaction-channel surfaces 155 and defining the reaction channels 150A, 150B also are formed of the sorbent material. In other embodiments, such as when the honeycomb substrate 110 is formed from a non-sorbent ceramic material (i.e., a material that does not reversibly adsorb $CO_2$), to which sorbent material is added either during formation of the honeycomb substrate 110 or after the formation of the honeycomb substrate 110, sorbent material is exposed to each of the reaction-channel surfaces 155. The exchange-channel surfaces 165 comprise at least one coating layer. The at least one coating layer in the embodiment of FIG. 2 is a water-impermeable layer 170 formed from a polymer material, which will be described in greater detail below. The polymer material of the water-impermeable layer 170 does not substantially penetrate into the partition walls 120 that form the exchange-channel surfaces 165, the sorbent material of the partition walls 120, or the sorbent material of the reaction-channel surfaces 155.

In general, to produce the coating configuration of the embodiment of FIG. 2, regardless of whether the honeycomb substrate 110 is formed from a sorbent material or from a non-sorbent material to which sorbent material is added, the reaction channels 150 of the honeycomb substrate 110 may be masked or otherwise blocked while a coating material is introduced into only the heat-exchange channels 160. The coating material may be allowed to dry, optionally with heating, to form the at least one coating layer, including the water-impermeable layer 170, on only the heat-exchange channels 160. The reaction channels 150 may be unmasked after the coating process is complete.

Referring to FIG. 3, a partial view of a honeycomb substrate 110 (see FIG. 1) is depicted. In some embodiments, the honeycomb substrate 110 is formed from a sorbent material, as described above. Thereby, the partition walls 120 composing the reaction-channel surfaces 155 and defining the reaction channels 150A, 150B also are formed of the sorbent material. In other embodiments, such as when the honeycomb substrate 110 is formed from a non-sorbent ceramic material (i.e., a material that does not reversibly adsorb $CO_2$), to which sorbent material is added either during formation of the honeycomb substrate 110 or after the formation of the honeycomb substrate 110, sorbent material is exposed to each of the reaction-channel surfaces 155. The exchange-channel surfaces 165 comprise at least one coating layer. The at least one coating layer in the embodiment of FIG. 3 comprises a water-impermeable layer 170 formed from a polymer material, which will be described in greater detail below, and at least one additional layer 180, which also will be described in greater detail below, overlying the water-impermeable layer 170. The polymer material of the water-impermeable layer 170 does not substantially penetrate into the partition walls 120 that form the exchange-channel surfaces 165, the sorbent material of the partition walls 120, or the sorbent material of the reaction-channel surfaces 155.

In general, to produce the coating configuration of the embodiment of FIG. 2, regardless of whether the honeycomb substrate 110 is formed from a sorbent material or from a non-sorbent material to which sorbent material is added, the reaction channels 150 of the honeycomb substrate 110 may be masked or otherwise blocked while coating materials is introduced into only the heat-exchange channels 160. A first coating material may be introduced into only the heat-exchange channels 160 and, optionally, dried by heating, for example, to form the water-impermeable layer 170. Subsequently, a second coating material may be introduced into only the heat-exchange channels 160 and, optionally, dried by heating, for example, to form the at least one additional layer 180 overlying the water-impermeable layer 170. The reaction channels 150 may be unmasked after the coating process is complete.

Referring now generally to the absorbent structure 100 exemplified in FIG. 1 and further exemplified in FIGS. 2 and 3, the exchange-channel surfaces 165 of the honeycomb substrate 110 comprise at least one coating layer. The at least one coating layer comprises a water-impermeable layer 170 (FIGS. 2 and 3) formed from a polymer material and, optionally, further comprises at least one additional layer 180 (FIG. 3) overlying the water-impermeable layer 170. It should be understood that, although FIG. 3 depicts the at least one coating layer as a single layer (FIG. 2), or as two layers (FIG. 3), the at least one coating layer may be made up of multiple coating layers sequentially deposited onto the partition walls 120 defining the exchange-channel surfaces 165. Likewise, in some embodiments the at least one coating layer may comprise exactly one water-impermeable layer 170 formed from a single polymer material or may comprise more than one water-impermeable layer 170, each being formed from different polymer materials. In all embodiments, the polymer material of the water-impermeable layer 170 does not substantially penetrate into the partition wall 120 that form the exchange-channel surfaces 165, the sorbent material of the partition walls 120, or the sorbent material of the reaction-channel surfaces 155, as described above.

According to some embodiments, the water-impermeable layer 170 may comprise a polymer material that is impervious to water. Thereby, if during a $CO_2$ capture process water is used as a thermal-transfer medium in the heat-exchange channels 160, the water cannot penetrate into sorbent material (whether in the partition walls 120 or on the reaction-channel surfaces 155) in which adsorption of $CO_2$ is occurring. Without intent to be bound by theory, it is believed that the presence of a thermal-transfer medium such as water in the sorbent material may substantially reduce the ability of the absorbent structure 100 to remove $CO_2$ from a process gas stream containing the $CO_2$. In some embodiments, the polymer material may be both impervious to water and hydrophobic.

The polymer material of the water-impermeable layer 170 may be selected from any polymer material capable of forming a uniform coating on the material of the honeycomb substrate 110 while not substantially penetrating into any portion of the honeycomb substrate 110 made from sorbent material necessary for $CO_2$ capture. In illustrative embodiments, polymer materials that are particularly well-suited for this purpose include, without limitation, poly(vinyl butyral) resins, polyacrylates, polynitriles (including carboxylated-acrylonitrile-co-butadienes), polychloroprene (neoprene), poly(vinyl chloride), poly(vinylidene fluoride), polyolefins such as polyethylene or polypropylene, poly(tetrafluoroethylene), silicones, polyurethanes, composites containing one or more of these, and mixtures of two or more of these, for example. The materials of the illustrative embodiments are especially well-suited for use on honeycomb substrates made from ceramic such as zeolites, cordierite, silicon carbide (SiC), aluminum titanate, mullite, spinel, perovskites, silicates, carbon, or alumina and mixtures thereof, for example.

In some embodiments, the water-impermeable layer 170 of the at least one coating layer on the exchange-channel surfaces 165 may be formed on or deposited onto the partition walls 120 directly. As will be described in greater detail below with respect to methods for forming the absorbent structure 100, in some embodiments the water-impermeable layer 170 may be deposited by introducing into the honeycomb substrate 110 an aqueous polymer emulsion or dispersion containing a chosen cured or uncured polymer material. The polymer material in the aqueous polymer emulsion may have a particle size suitable to prevent penetration of the polymer material into any sorbent material, and the viscosity of the aqueous polymer emulsion may be chosen to provide suitable pourability and coating uniformity. Particularly when the honeycomb substrate 110 has a high cell density such as greater than 800 individual channels per square inch of the inlet surface 130, the viscosity of the aqueous polymer emulsion may also be chosen to be sufficiently low to enable the aqueous polymer emulsion to enter the individual channels 150, 160 without impedance from surface tension, for example. Once the exchange-channel surfaces 165 are adequately covered with the polymer material, the aqueous vehicle in the aqueous polymer emulsion may be removed, such as by drying with or without heat, and, if necessary, the polymer material may be allowed to crosslink or cure to form the water-impermeable layer.

In further embodiments, as in the embodiment of FIG. 3, for example, the at least one coating layer may further comprise at least one additional layer 180 overlying the water-impermeable layer 170. In such embodiments, the at least one additional layer 180 may function as a top coat that increases the imperviousness of the exchange-channel surfaces 165 to water, greater than is achieved by the water-impermeable layer 170 by itself. In other embodiments not shown, the at least one additional layer 180 may be interposed between the exchange-channel surfaces 165 and the water-impermeable layer 170. In such embodiments, at least one additional layer 180 may function as a primer coating, for example, that decreases the porosity of the exchange-channel surfaces 165 to the extent necessary to prevent the polymer material of the water-impermeable layer 170 from substantially penetrating into sorbent material of the partition walls 120 when the water-impermeable layer is deposited or applied. In some embodiments, the at least one additional layer 180 may comprise a polymer material different from the polymer material of the water-impermeable layer 170. In non-limiting illustrative embodiments, the at least one coating layer of the exchange-channel surfaces 165 may comprise the water-impermeable layer 170, described above, and at least one additional layer 180 of a polymer material beneath or overlying the water-impermeable layer 170. In non-limiting embodiments, the polymer material of the at least one additional layer 180 may be selected from polymers such as, for example, polystyrenes, epoxy resins, polyesters, polycarbonates, nylons, poly(vinyl butyral) resins, polyacrylates, polynitriles (including carboxylated-acrylonitrile-co-butadienes), polychloroprene (neoprene), poly(vinyl chloride), poly(vinylidene fluoride), polyolefins such as polyethylene or polypropylene, poly(tetrafluoroethylene), silicones, polyurethanes, composites containing one or more of these, and mixtures of two or more of these.

In the absorbent structure 100 according to some embodiments described above, in general the exchange-channel surfaces 165 may be coated with the at least one coating layer, including the water-impermeable layer 170 and, optionally, the at least one additional layer 180. In all cases, the thickness of the one or more layers coated on the exchange-channel surfaces 165 varies, depending on the cell density of the honeycomb substrate 110. In some embodiments, the total thicknesses of coatings on the exchange-channel surfaces 165 may be limited such that the heat-exchange channels 160 including the coatings are less than 50%, less than 40%, less than 30%, less than 20%, less than 10%, less than 5%, or less than 1% occluded by all coating layers in the respective heat-exchange channels 160, based on the area of the individual heat exchange channels 160 in a cross-section perpendicular to the axial direction 90. In some embodiments, the total thickness of the at least one coating layer (including the water-impermeable layer 170 and, optionally, the at least one additional layer 180) may be from 0.01 µm to about 600 µm, such as from about 3 µm to about 50 µm, for example.

Having described various embodiments of the absorbent structure 100 of FIG. 1 with references to FIGS. 2 and 3, methods for forming the absorbent structure 100 now will be described. In some embodiments, the methods involve providing a honeycomb substrate 110 formed from a sorbent material. In other embodiments, the methods involve providing a honeycomb substrate 110 formed from a ceramic support material other than the sorbent material used for $CO_2$ adsorption, including, for example, non-sorbent materials, to which sorbent material is added either during or after the formation of the honeycomb substrate 110. In the following description of methods, occasional reference will be made to structural aspects of the absorbent structures of FIGS. 1-3 and also to the schematic depiction in FIG. 4 of one embodiment of a delivery configuration 200 used in the methods for forming the absorbent structure 100.

According to some embodiments, methods for forming an absorbent structure 100 for $CO_2$ capture may include providing a honeycomb substrate 110 formed from a sorbent material. Suitable sorbent materials from which the honeycomb substrate 110 may be prepared include, as non-limiting examples, zeolites, carbon, zeolitic imadazole framework, metallic organic framework, carbon, mesoporous alumina and silicas including SBA-15 and analogs, and combinations of the above materials. Particularly suitable sorbent materials for $CO_2$ include, in non-limiting embodiments, zeolites, zeolites, zeolitic imadazole frameworks, metallic organic frameworks, carbon, mesoporous alumina and silicas including SBA-15 and analogs, combinations of the above materials, and any of the above materials functionalized with an amine or amino group.

The honeycomb substrate 110 formed from the sorbent material may have partition walls 120 that extend through the honeycomb substrate 110 in an axial direction 90 from an inlet surface 130 of the honeycomb substrate 110 to an outlet surface 140 of the honeycomb substrate 110 opposite the inlet surface 130. The partition walls 120 have channel surfaces 125 that define a plurality of individual channels 150, 160. The plurality of individual channels 150, 160 include a plurality of reaction channels 150 and a plurality of heat-exchange channels 160. Thereby, the channel surfaces 125 of the reaction channels 150 are reaction-channel surfaces 155 and the channel surfaces 125 of the heat-exchange channels 160 are exchange-channel surfaces 165.

The methods including the honeycomb substrate 110 made from sorbent material may further comprise masking inlet ends and outlet ends of each of the reaction channels 150 to form masked reaction channels. In some embodiments, the reaction channels 150 may be masked, for example, by blocking the reaction channels 150 with a foreign object or a removable substance. In other embodiments, the reaction channels 150 may be masked using a masking device that covers only the ends of the reaction channels 150 but leaves open the ends of the heat-exchange channels 160. Thereby, a liquid solution such as an emulsion or a dispersion may be introduced into only the reaction channels 150. The reaction channels 150 may be unmasked, such as by removing the masking device, after the coating process is complete.

Figure 4:
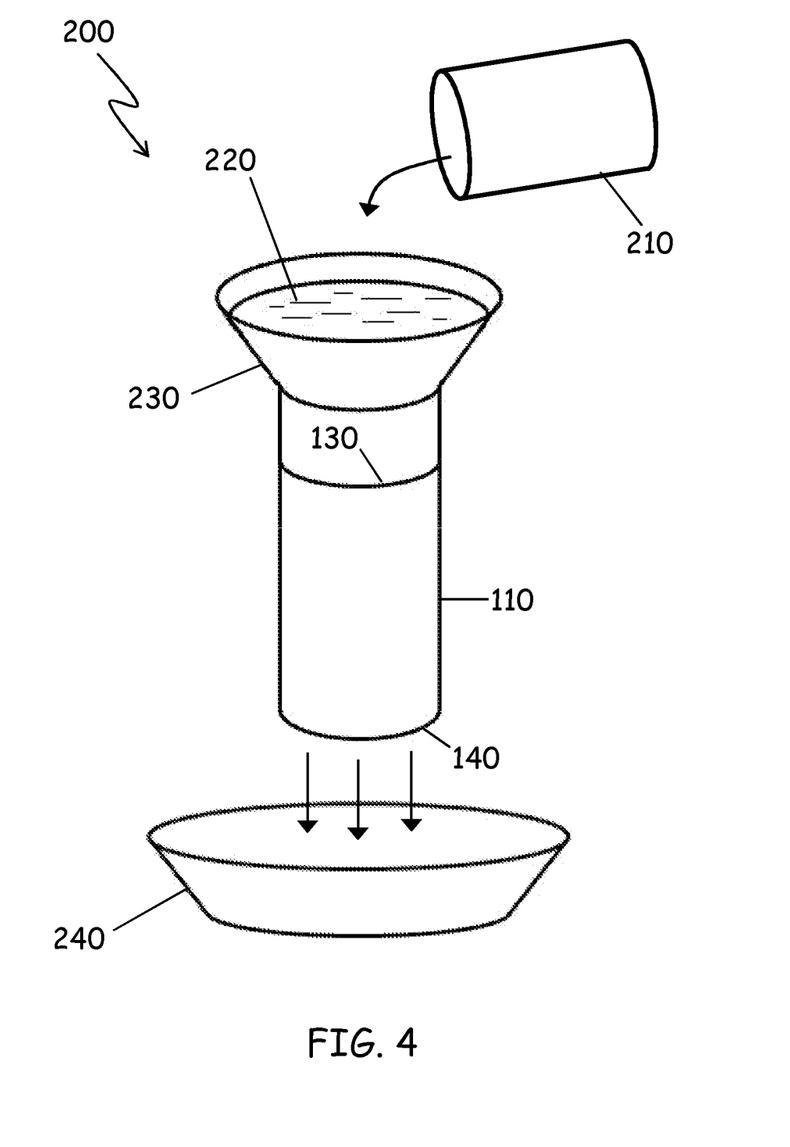
FIG. 4 is a schematic representation of a coating procedure according to some embodiments described herein of methods for forming the absorbent structure according to embodiments described herein.

Once the reaction channels 150 are masked, a liquid composition may be delivered onto the inlet surface 130 of the honeycomb substrate 110 to cause the liquid composition flow through each of the heat-exchange channels 160 but not to flow through the masked reaction channels 150. The delivery of the liquid composition according to one embodiment of a delivery configuration 200 is depicted schematically in FIG. 5. In this embodiment, the liquid composition 220 may be poured from a container 210 into a funnel 230. The funnel 230 may be connected to the inlet surface 130 of the honeycomb substrate 110 so as to form a leak-proof seal that prevents the liquid composition 220 from laterally emerging from the funnel 230 without flowing into the channels of the honeycomb substrate 110. The liquid composition 220 then is drawn through the channels of the honeycomb substrate 110 toward the outlet surface 140 by gravity, for example. Excess amounts of the liquid composition 220 may exit the honeycomb substrate 110 through the outlet surface 140 and may be received in any suitable receiving vessel 240, for example. In alternative embodiments not shown, the liquid composition may be drawn through the honeycomb substrate 110 with assistance from a vacuum apparatus attached to the outlet surface 140, for example. Those having ordinary skill in the appropriate arts should easily appreciate that numerous variations exist to the process involved with delivering the liquid composition to the heat-exchange channels 160.

In some embodiments, the liquid composition may be an emulsion or dispersion containing particles of a polymer material. The emulsion or dispersion may be aqueous or non-aqueous. In other embodiments, the emulsion or dispersion may contain uncured monomers that, when cured, form the polymer material. The delivery of an aqueous polymer emulsion to the heat-exchange channels 160 results in the formation of an emulsion coating of the aqueous polymer emulsion over the exchange-channel surfaces 165 only. The emulsion coating may be dried, such as by heating or by blowing air over the exchange-channel surfaces 165, to form a water-impermeable layer 170 on the exchange-channel surfaces 165, thereby resulting in the configuration of FIG. 2.

The liquid composition, in particular when the liquid composition is an aqueous emulsion or dispersion, may contain uncured monomers such as vinylbutyrals, acrylic monomers, carboxylated acrylonitriles, butadienes, nitriles, chloroprenes, vinyl chlorides, vinylidene fluorides, olefins such as ethylene or propylene, tetrafluoroethylene, siloxanes, urethanes, or mixtures of any of these. Thereby, the water-impermeable layer formed from such monomers may comprise a polymer material selected from poly(vinyl butyral) resins, polyacrylates, polynitriles (including carboxylated-acrylonitrile-co-butadienes), polychloroprenes, poly(vinyl chlorides), poly(vinylidene fluorides), polyolefins such as polyethylene or polypropylene or copolymers thereof, poly(tetrafluoroethylene), silicones, polyurethanes mixtures thereof, and composites thereof, for example.

In embodiments in which the liquid composition contains particles, such as in aqueous polymer emulsions, the particles may be particles of the polymer material having median particle sizes of from 0.1 μm to 20 μm. In further embodiments, the median particle sizes may be from 0.1 μm to 2.0 μm. The aqueous polymer emulsion may have a wide range of viscosities such as from 50 cP to 5000 cP at 25° C. Except as noted otherwise, viscosities herein refer to those measured using a Brookfield viscometer with an LVF No. 3 spindle spinning at 30 r.p.m. at 25° C. It may be preferable to choose the viscosity of the aqueous polymer emulsion based on the cell density of the honeycomb substrate 110. Thus, in some embodiments the honeycomb substrate 110 may have a cell density of from about 100 to about 2000 individual channels 150, 160, from about 300 to about 1500 individual channels 150, 160, or from about 600 to about 1500 individual channels 150, 160 per square inch of the inlet surface 130 and the aqueous polymer emulsion may have a viscosity of from 50 cP to 5000 cP at 25° C. In some embodiments, the aqueous polymer emulsion may have a solids content of from 10% to 50% by weight, based on the total weight of the aqueous polymer emulsion.

In some embodiments, the methods including the honeycomb substrate 110 made from sorbent material may further include blowing a gas such as air or nitrogen, for example, through the heat-exchange channels 160 after the emulsion coating is formed to remove excess aqueous polymer emulsion from the heat-exchange channels 160.

According to some embodiments, the methods including the honeycomb substrate 110 made from sorbent material may further include forming the at least one additional layer 180 as a topcoat on the water-impermeable layer 170 on the exchange-channel surfaces 165. To form the topcoat, a second aqueous polymer emulsion may be delivered onto the inlet surface 130 of the honeycomb substrate 110 to cause the second aqueous polymer emulsion to flow through each of the heat-exchange channels 160 but not to flow through the masked reaction channels 150. Thereby, an emulsion coating of the second aqueous polymer emulsion is formed over the water-impermeable layer. This emulsion coating may be dried, by heating or by blowing a gas, for example to form the at least one additional layer 180 as a topcoat on the water-impermeable layer 170. In non-limiting illustrative embodiments, the topcoat may be formed from polystyrene or epoxy resins.

According to some embodiments, methods for forming an absorbent structure 100 for $CO_2$ capture may include providing a honeycomb substrate 110 formed from a ceramic material. The ceramic material may be a sorbent material or a non-sorbent material. The honeycomb substrate 110 made of the ceramic material has partition walls 120 that extend through the honeycomb substrate 110 in an axial direction 90 from an inlet surface 130 of the honeycomb substrate 110 to an outlet surface 140 of the honeycomb substrate 110 opposite the inlet surface 130. The partition walls 120 have channel surfaces 125 that define a plurality of individual channels 150, 160. The plurality of individual channels 150, 160 comprises a plurality of reaction channels 150 and a plurality of heat-exchange channels 160, whereby the channel surfaces 125 of the reaction channels 150 are reaction-channel surfaces 155 and the channel surfaces 125 of the heat-exchange channels 160 are exchange-channel surfaces 165.

The methods including the honeycomb substrate 110 formed from a ceramic material may further comprise loading the ceramic material with a sorbent material before delivering the aqueous polymer emulsion. In some embodiments, the ceramic material may be loaded with sorbent material by adding the sorbent material to a green ceramic material to form a green composite, then forming the honeycomb substrate 110 from the green composite by co-extrusion, for example. The honeycomb substrate 110 formed from the green composite may be treated, by firing, for example, to form a honeycomb substrate 110 made of a ceramic material and loaded with sorbent material. In other embodiments, the ceramic material may be loaded with sorbent material by delivering a sorbent precursor into the inlet surface 130 of the honeycomb substrate 110 to cause the sorbent precursor to flow through at least the reaction channels 150, thereby forming a precursor coating of the sorbent precursor on at least the reaction-channel surfaces 150. In some embodiments, delivering the sorbent precursor may comprise delivering the sorbent precursor onto the inlet surface 130 of the honeycomb substrate 110 to cause the sorbent precursor to flow through both the reaction channels 150 and the heat-exchange channels 160. In other embodiments, before the sorbent precursor is delivered, inlet ends and outlet ends of each of the heat-exchange channels 160 may be masked to form masked heat-exchange channels. Then, delivering the sorbent precursor may comprise delivering the sorbent precursor onto the inlet surface 130 of the honeycomb substrate 110 to cause the sorbent precursor to flow through the reaction channels 150 and not to flow through the masked heat-exchange channels 160, thereby forming a precursor coating of the sorbent precursor on the reaction-channel surfaces 155 only.

The sorbent precursor may be any compound that, when heated or dried, for example, forms a sorbent material, as described above. The transformation of the sorbent precursor to the sorbent material used to load the honeycomb substrate 110 may be a physical transformation only, without any chemical transformation. For example, the sorbent precursor may contain the sorbent material dispersed in a liquid such as water or organic solvent, whereby evaporation of the solvent results in a sorbent coating of the sorbent material that was contained in the sorbent precursor, even though the sorbent material itself does not undergo any chemical transformation.

After the precursor coating is formed, the honeycomb substrate may be heated to a suitable temperature such as from 50° C. to 100° C., to convert the precursor coating to a sorbent coating on at least the reaction-channel surfaces 155. The sorbent coating may comprise a sorbent material different from the ceramic material from which the honeycomb substrate 110 is formed.

The methods including the honeycomb substrate 110 formed from a ceramic material further comprise forming a water-impermeable layer 170 over the exchange-channel surfaces 165. To form the water-impermeable layer 170 on the exchange-channel surfaces 165, inlet ends and outlet ends of each of the reaction channels 150 may be masked, as described above, to form masked reaction channels. Then, an aqueous polymer emulsion may be delivered onto the inlet surface 130 of the honeycomb substrate 110, as described above, to cause the aqueous polymer emulsion to flow through each of the heat-exchange channels 160 and not to flow through the masked reaction channels 150. Thereby, an emulsion coating of the aqueous polymer emulsion is formed over the exchange-channel surfaces 165 only. The water-impermeable layer 170 and the coating compositions used to form the emulsion coating may be any of the liquid compositions described above with regard to the methods in which the honeycomb substrate 110 is formed from a sorbent material. The emulsion coating may be dried, heated, or cured, to form the water-impermeable layer over the exchange-channel surfaces 165. Optionally, at least one additional layer 180 may be formed over the water-impermeable layer 170, according to one or more of the embodiments described above, in which the honeycomb substrate 110 is formed from a sorbent material.

Thus, absorbent structures 100 including a honeycomb substrate 110 have been described, in which heat-exchange channels 160 coated with at least one coating layer including water-impermeable layer 170 and, optionally, at least one additional layer 180, may enable rapid, efficient, and uniform thermal management during thermal-swing adsorption processes, for example, which may employ the absorbent structures 100. Furthermore, methods for forming the absorbent structures 100 have been described.

EXAMPLES

The embodiments described herein will be further clarified by the following examples.

Example 1

A honeycomb substrate was coated as schematically illustrated in FIG. 4. A polymer emulsion of Butvar aqueous dispersion RS-261 (a milky-white colored, stable aqueous emulsion of plasticized poly(vinyl butyral) with a solids content of from 40% to 43% by weight and particle sizes of from 0.5 µm to 1.5 µm, available from Butvar) was prepared. The channels intended to be reaction channels were plugged on both ends, and the channels intended to be heat-exchange channels were left open. The polymer emulsion was poured on the top side of the honeycomb substrate into the open heat-exchange channels and was allowed to flow through the heat-exchange channels and to emerge from the bottom end of the honeycomb substrate. After the coating, an air knife was used to blow out excess polymer emulsion to avoid the channels being blocked while leaving a layer of polymer emulsion attached to the channel surface). The reaction channels were unplugged. The polymer coated substrate was dried at room temperature overnight in an oven preheated to 70° C.

A second polymer layer on the first polymer layer was achieved by following the same basic procedure. In two separate examples, second polymer layers were made. In one example, an emulsion of polystyrene (Aldrich, 10% solution with toluene) was used. In the other example, an epoxy resin was used. The epoxy resin coating was made by introducing a mixture of Erisys GE22 (1,4-cycloheaxnedimethanol diglycidyl ether cycloaliphatic difunctional epoxy reactive diluent, available from CVC Thermoset Specialties) and 4,4'-methylenebiscyclohexanamine (Amicure PACM, from Air Products) into the heat-exchange channels. The mixture for the epoxy resin coating was prepared as a 50% (w/w) ethanol solution having a 1:1 molar ratio of epoxy to amine.

Example 2

A polymer coated surface prepared according to Example 1 on a honeycomb substrate, with a Butvar emulsion first layer and a polystyrene second layer, was evaluated by cutting the honeycomb substrate parallel to its axial length to expose the polymer coating. Water was dropped onto the polymer surface with an eyedropper, and the honeycomb substrate was placed in a Petri dish for observation. Permeability of the water on the polymer coating was evaluated by observing the water drop. Observations made after 2 hours and again after 6 hours revealed no significant change to the shape and size of the water drop on the polymer coated surface.

In a first aspect, the disclosure provides an absorbent structure 100 for $CO_2$ capture. The absorbent structure 100 comprises a honeycomb substrate 110 having partition walls 120 that extend through the honeycomb substrate 110 in an axial direction 90 from an inlet surface 130 of the honeycomb substrate 110 to an outlet surface 140 of the honeycomb substrate 110 opposite the inlet surface 130. The partition walls 120 have channel surfaces 125 that define a plurality of individual channels 150, 160. The plurality of individual channels 150, 160 comprise a plurality of reaction channels 150 and a plurality of heat-exchange channels 160, whereby the channel surfaces 125 of the reaction channels 150 are reaction-channel surfaces 155 and the channel surfaces 125 of the heat-exchange channels 160 are exchange-channel surfaces 165. The reaction channels 150 and the heat-exchange channels 160 are arranged such that individual reaction channels 150A, 150B are in thermal communication with individual heat-exchange channels 160A, 160B. The reaction-channel surfaces 155 comprise a sorbent material, and the exchange-channel surfaces 165 comprise at least one coating layer. The at least one coating layer comprises a water-impermeable layer 170 formed from a polymer material selected from the group consisting of poly(vinyl butyral) resins, polyacrylates, carboxylated-acrylonitrile-co-butadienes, polynitriles, latexes, polychloroprenes, poly(vinyl chloride), poly(vinylidene fluoride), polyolefins, poly(tetrafluoroethylene), silicones, polyurethanes, mixtures thereof, and composites thereof. The polymer material of the water-impermeable layer 170 does not substantially penetrate into the partition walls 120 that form the exchange-channel surfaces 165, the sorbent material of the partition walls 120, or the sorbent material of the reaction-channel surfaces 155.

In a second aspect, the disclosure provides an absorbent structure 100 according to the first aspect, in which the honeycomb substrate 110 is formed from the sorbent material.

In a third aspect, the disclosure provides an absorbent structure 100 according to the first or second aspect in which the sorbent material is selected from the group consisting of zeolite, cordierite, alumina, silica, and mixtures thereof.

In a fourth aspect, the disclosure provides an absorbent structure 100 according to the first or third aspect, in which the honeycomb substrate 110 is formed from a ceramic material other than the sorbent material and the reaction-channel surfaces 155 are coated with a sorbent coating containing the sorbent material.

In a fifth aspect, the disclosure provides an absorbent structure 100 according to the first or third aspect, in which the honeycomb substrate 110 is formed from a ceramic material other than the sorbent material; and the ceramic material is loaded with the sorbent material during or after the formation of the honeycomb substrate 110.

In a sixth aspect, the disclosure provides an absorbent structure 100 according to the fourth or fifth aspect, in which the ceramic material is a non-sorbent ceramic material.

In a seventh aspect, the disclosure provides an absorbent structure 100 according to any one of the first through sixth aspects, in which the honeycomb substrate 110 has a cell density of from about 100 to about 2000 individual channels 150, 160 per square inch of the inlet surface 130.

In an eighth aspect, the disclosure provides an absorbent structure 100 according to any one of the first through seventh aspects, in which the honeycomb substrate 110 has a channel density of from about 300 to about 1500 individual channels 150, 160 per square inch of the inlet surface 130.

In a ninth aspect, the disclosure provides an absorbent structure 100 according to any one of the first through eighth aspects, in which the honeycomb substrate 110 has a channel density of from about 600 to about 1500 individual channels 150, 160 per square inch of the inlet surface 130.

In a tenth aspect, the disclosure provides an absorbent structure 100 according to any one of the first through ninth aspects, in which the at least one coating layer further comprises at least one additional layer 180 overlying the water-impermeable layer 170, the at least one additional layer 180 comprising a polymer material different from the polymer material of the water-impermeable layer 170.

In an eleventh aspect, the disclosure provides an absorbent structure 100 according to any one of the first through tenth aspects, in which the water-impermeable layer 170 is a poly (vinyl butyral) resin.

In a twelfth aspect, the disclosure provides methods for forming an absorbent structure 100 for $CO_2$ capture according to any one of the first through third or seventh through eleventh aspects. The method comprises providing a honeycomb substrate 110 formed from a sorbent material, the honeycomb substrate 110 having partition walls 120 that extend through the honeycomb substrate 110 in an axial direction 90 from an inlet surface 130 of the honeycomb substrate 110 to an outlet surface 140 of the honeycomb substrate 110 opposite the inlet surface 130, the partition walls 120 having channel surfaces 125 that define a plurality of individual channels 150, 160, the plurality of individual channels 150, 160 comprising a plurality of reaction channels 150 and a plurality of heat-exchange channels 160, whereby the channel surfaces 125 of the reaction channels 150 are reaction-channel surfaces 155 and the channel surfaces 125 of the heat-exchange channels 160 are exchange-channel surfaces 165. The method further comprises masking inlet ends and outlet ends of each of the reaction channels 150 to form masked reaction channels. The method further comprises delivering an aqueous polymer emulsion onto the inlet surface 130 of the honeycomb substrate 110 to cause the aqueous polymer emulsion to flow through each of the heat-exchange channels 160 and not to flow through the masked reaction channels 150, thereby forming an emulsion coating of the aqueous polymer emulsion over the exchange-channel surfaces 165 only. The method may further comprise drying the emulsion coating to form a water-impermeable layer 170 on the exchange-channel surfaces 165. The water-impermeable layer 170 may comprise a polymer material selected from the group consisting of poly(vinyl butyral) resins, polyacrylates, carboxylated-acrylonitrile-co-butadienes, polynitriles, latexes, polychloroprenes, poly(vinyl chloride), poly(vinylidene fluoride), polyolefins, poly(tetrafluoroethylene), silicones, polyurethanes mixtures thereof, and composites thereof.

In a thirteenth aspect, the disclosure provides methods according to the twelfth aspect, in which the aqueous polymer emulsion comprises uncured monomers that form the polymer material when cured or particles of the polymer material.

In a fourteenth aspect, the disclosure provides methods according to the twelfth or thirteenth aspect, in which the aqueous polymer emulsion comprises particles of the polymer material having a median particle size of from 0.1 μm to 20 μm.

In a fifteenth aspect, the disclosure provides methods according to any one of the twelfth through fourteenth aspects, in which the aqueous polymer emulsion has a viscosity of from 50 cP to 5000 cP at 25° C.

In a sixteenth aspect, the disclosure provides methods according to any one of the twelfth through fifteenth aspects, in which the aqueous polymer emulsion has a solids content of from 10% to 50% by weight, based on the total weight of the aqueous polymer emulsion.

In a seventeenth aspect, the disclosure provides methods according to any one of the twelfth through sixteenth aspects, in which the honeycomb substrate 110 has a cell density of from about 100 to about 2000 individual channels 150, 160 per square inch of the inlet surface 130 and the aqueous polymer emulsion has a viscosity of from 50 cP to 5000 cP at 25° C.

In an eighteenth aspect, the disclosure provides methods according to any one of the twelfth through seventeenth aspects, in which the honeycomb substrate 110 has a channel density of from about 300 to about 1500 individual channels 150, 160 per square inch of the inlet surface 130 and the aqueous polymer emulsion has a viscosity of from 50 cP to 5000 cP at 25° C.

In a nineteenth aspect, the disclosure provides methods according to any one of the twelfth through eighteenth aspects, in which the honeycomb substrate 110 has a channel density of from about 600 to about 1500 individual channels 150, 160 per square inch of the inlet surface 130 and the aqueous polymer emulsion has a viscosity of from about 50 cP to 5000 cP at 25° C.

In a twentieth aspect, the disclosure provides methods according to any one of the twelfth through nineteenth aspects, further comprising blowing a gas through the heat-exchange channels 160 after the emulsion coating is formed to remove excess aqueous polymer emulsion from the heat-exchange channels 160.

In a twenty-first aspect, the disclosure provides methods according to any one of the twelfth through twentieth aspects, further comprising delivering a second aqueous polymer emulsion onto the inlet surface 130 of the honeycomb substrate 110 to cause the second aqueous polymer emulsion to flow through each of the heat-exchange channels 160 and not to flow through the masked reaction channels 150, thereby forming an emulsion coating of the second aqueous polymer emulsion over the water-impermeable layer 170; and drying the emulsion coating of the second aqueous polymer emulsion to form at least one additional layer 180 as a topcoat on the water-impermeable layer 170.

In a twenty-second aspect, the disclosure provides methods according to the twenty-first aspect, in which the at least one additional layer 180 functioning as a topcoat comprises a polymer material selected from the group consisting of polystyrene and epoxy resins.

In a twenty-third aspect, the disclosure provides methods for forming an absorbent structure 100 for $CO_2$ capture according to any one of the first or the fourth through the eleventh aspects, comprising providing a honeycomb substrate 110 formed from a ceramic material and loaded with a sorbent material, the honeycomb substrate 110 having partition walls 120 that extend through the honeycomb substrate 110 in an axial direction 90 from an inlet surface 130 of the honeycomb substrate 110 to an outlet surface 140 of the honeycomb substrate 110 opposite the inlet surface 130, the partition walls 120 having channel surfaces 125 that define a plurality of individual channels 150, 160, the plurality of individual channels 150, 160 comprising a plurality of reaction channels 150 and a plurality of heat-exchange channels 160, whereby the channel surfaces 125 of the reaction channels 150 are reaction-channel surfaces 155 and the channel surfaces 125 of the heat-exchange channels 160 are exchange-channel surfaces 165. The method further comprises masking inlet ends and outlet ends of each of the reaction channels 150 to form masked reaction channels. The method further comprises delivering a first aqueous polymer emulsion onto the inlet surface 130 of the honeycomb substrate 110 to cause the first aqueous polymer emulsion to flow through each of the heat-exchange channels 160 and not to flow through the masked reaction channels 150, thereby forming a first emulsion coating of the first aqueous polymer emulsion over the exchange-channel surfaces 165 only. The method further comprises drying the first emulsion coating to form a water-impermeable layer 170 over the exchange-channel surfaces 165. The water-impermeable layer 170 comprises a polymer material selected from the group consisting of poly(vinyl butyral) resins, polyacrylates, carboxylated-acrylonitrile-co-butadienes, polynitriles, latexes, polychloroprenes, poly(vinyl chloride), poly(vinylidene fluoride), polyolefins, poly(tetrafluoroethylene), silicones, polyurethanes mixtures thereof, and composites thereof.

In a twenty-fourth aspect, the disclosure provides methods according to the twenty-third aspect, in which the first aqueous polymer emulsion comprises uncured monomers that form the polymer material when cured or particles of the polymer material having a median particle size of from 0.1 µm to 20 µm.

In a twenty-fifth aspect, the disclosure provides methods according to the twenty-third or twenty-fourth aspects, further comprising washcoating the honeycomb substrate with the sorbent material to load the honeycomb substrate with the sorbent material before delivering the first aqueous polymer emulsion.

In a twenty-sixth aspect, the disclosure provides methods according to any one of the twenty-third through twenty-fifth aspects, further comprising delivering a second aqueous polymer emulsion onto the inlet surface of the honeycomb substrate to cause the second aqueous polymer emulsion to flow through each of the heat-exchange channels and not to flow through the masked reaction channels, thereby forming a second emulsion coating of the second aqueous polymer emulsion over the water-impermeable layer; and, optionally, drying the second emulsion coating of the second aqueous polymer emulsion to form at least one additional layer as a topcoat overlying the water-impermeable layer.

In a twenty-seventh aspect, the disclosure provides methods according to any one of the twenty-third through twenty-sixth aspects, in which the first and/or second aqueous polymer emulsion comprises uncured monomers that form the polymer material when cured or particles of the polymer material.

In a twenty-eighth aspect, the disclosure provides methods according to any one of the twenty-third through the twenty-seventh aspects, in which the first and/or second aqueous polymer emulsion comprises particles of the polymer material having a median particle size of from 0.1 µm to 20 µm.

In a twenty-ninth aspect, the disclosure provides methods according to any one of the twenty-third through the twenty-eighth aspects, in which the first and/or second aqueous polymer emulsion has a viscosity of from 50 cP to 5000 cP at 25° C.

In a thirtieth aspect, the disclosure provides methods according to any one of the twenty-third through the twenty-ninth aspects, in which the first and/or second aqueous polymer emulsion has a solids content of from 10% to 50% by weight, based on the total weight of the first and/or second aqueous polymer emulsion.

In a thirty-first aspect, the disclosure provides methods according to any one of the twenty-third through the thirtieth aspects, in which the honeycomb substrate 110 has a cell density of from about 100 to about 2000 individual channels 150, 160 per square inch of the inlet surface 130 and the first and/or second aqueous polymer emulsion has a viscosity of from 50 cP to 5000 cP at 25° C.

In a thirty-second aspect, the disclosure provides methods according to any one of the twenty-third through the thirty-first aspects, in which the honeycomb substrate 110 has a channel density of from about 300 to about 1500 individual channels 150, 160 per square inch of the inlet surface 130 and the first and/or second aqueous polymer emulsion has a viscosity of from 50 cP to 5000 cP at 25° C.

In a thirty-third aspect, the disclosure provides methods according to any one of the twenty-third through the thirty-second aspects, in which the honeycomb substrate 110 has a channel density of from about 600 to about 1500 individual channels 150, 160 per square inch of the inlet surface 130 and the first and/or second aqueous polymer emulsion has a viscosity of from about 50 cP to 5000 cP at 25° C.

In a thirty-fourth aspect, the disclosure provides methods according to any one of the twenty-third through the thirty-third aspects, further comprising blowing a gas through the heat-exchange channels 160 after the first and/or second emulsion coating is formed to remove excess first and/or second aqueous polymer emulsion from the heat-exchange channels 160.

In a thirty-fifth aspect, the disclosure provides methods according to any one of the twenty-third through the thirty-fourth aspects, in which the top coat comprises a polymer material selected from the group consisting of polystyrene and epoxy resins.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An absorbent structure for CO2 capture comprising:
a honeycomb substrate having porous partition walls that extend through the honeycomb substrate in an axial direction from an inlet surface of the honeycomb substrate to an outlet surface of the honeycomb substrate opposite the inlet surface, the porous partition walls having channel surfaces that define a plurality of individual channels, wherein:
the plurality of individual channels comprise a plurality of reaction channels and a plurality of heat-exchange channels, whereby the channel surfaces of the reaction channels are reaction-channel surfaces and the channel surfaces of the heat-exchange channels are exchange-channel surfaces;
the reaction channels and the heat-exchange channels are arranged such that individual reaction channels are in thermal communication with individual heat-exchange channels;
the reaction-channel surfaces comprise a sorbent material;
the exchange-channel surfaces comprise at least one coating layer disposed thereon; and
the at least one coating layer comprises a water-impermeable layer formed from a polymer material selected from the group consisting of poly(vinyl butyral) resins, polyacrylates, polynitriles, polychloroprenes, poly(vinyl chloride), poly(vinylidene fluoride), polyolefins, poly(tetrafluoroethylene), silicones, polyurethanes, mixtures thereof, and composites thereof; and the polymer material of the water-impermeable layer penetrates into the porous partition walls that form the exchange-channel surfaces by less than 25% of a width of the porous partition walls.

2. The absorbent structure of claim 1, wherein the honeycomb substrate is formed from the sorbent material.

3. The absorbent structure of claim 1, wherein the sorbent material is selected from the group consisting of zeolites, Metallic Organic Frameworks, clays, layered double hydroxides, solid amines, alkali metal oxides, alkaline earth metal oxides, silicon carbide, mullite, alumina, aluminum titanate, carbon, and composites containing any of these.

4. The absorbent structure of claim 1, wherein the honeycomb substrate is formed from a ceramic material other than the sorbent material, and the ceramic material is loaded with the sorbent material during or after the formation of the honeycomb substrate.

5. The absorbent structure of claim 1, wherein the honeycomb substrate has a cell density of from about 100 to about 2000 individual channels per square inch of the inlet surface.

6. The absorbent structure of claim 1, wherein the at least one coating layer further comprises at least one additional layer overlying the water-impermeable layer, the at least one additional layer comprising a polymer material different from the polymer material of the water-impermeable layer.

7. The absorbent structure of claim 6, wherein the polymer material of the at least one additional layer comprises polystyrene or an epoxy resin.

8. The absorbent structure of claim 7, wherein the water-impermeable layer is a poly(vinyl butyral) resin.

9. A method for forming an absorbent structure for CO2 capture, the method comprising: providing a honeycomb substrate formed from a sorbent material, the honeycomb substrate having porous partition walls that extend through the honeycomb substrate in an axial direction from an inlet surface of the honeycomb substrate to an outlet surface of the honeycomb substrate opposite the inlet surface, the porous partition walls having channel surfaces that define a plurality of individual channels, the plurality of individual channels comprising a plurality of reaction channels and a plurality of heat-exchange channels, whereby the channel surfaces of the reaction channels are reaction-channel surfaces and the channel surfaces of the heat-exchange channels are exchange-channel surfaces; masking inlet ends and outlet ends of each of the reaction channels to form masked reaction channels;
delivering a first aqueous polymer emulsion onto the inlet surface of the honeycomb substrate to cause the first aqueous polymer emulsion to flow through each of the heat-exchange channels and not to flow through the masked reaction channels, thereby forming a first emulsion coating of the first aqueous polymer emulsion over the exchange-channel surfaces only; and drying the first emulsion coating to form a water-impermeable layer on the exchange-channel surfaces, wherein: the water-impermeable layer comprises a polymer material selected from the group consisting of poly(vinyl butyral) resins, polyacrylates, polynitriles, polychloroprenes, poly(vinyl chloride), poly(vinylidene fluoride), polyolefins, poly(tetrafluoroethylene), silicones, polyurethanes mixtures thereof, and composites thereof; and the polymer material of the water-impermeable layer penetrates into the porous partition walls that form the exchange-channel surfaces by less than 25% of a width of the porous partition walls.

10. The method of claim 9, wherein the first aqueous polymer emulsion comprises particles of the polymer material or uncured monomers that form the polymer material when cured.

11. The method of claim 10, wherein the first aqueous polymer emulsion comprises particles of the polymer material having a median particle size of from 0.1 μm to 20 μm.

12. The method of claim 9, wherein the first aqueous polymer emulsion has a viscosity of from 50 cP to 5000 cP at 25° C.

13. The method of claim 9, wherein the first aqueous polymer emulsion has a solids content of from 10% to 50% by weight, based on the total weight of the first aqueous polymer emulsion.

14. The method of claim 9, wherein the honeycomb substrate has a cell density of from about 100 to about 2000 individual channels per square inch of the inlet surface and the first aqueous polymer emulsion has a viscosity of from 50 cP to 5000 cP at 25° C.

15. The method of claim 9, further comprising:
delivering a second aqueous polymer emulsion onto the inlet surface of the honeycomb substrate to cause the second aqueous polymer emulsion to flow through each of the heat-exchange channels and not to flow through the masked reaction channels, thereby forming a second emulsion coating of the second aqueous polymer emulsion over the water-impermeable layer; and
drying the second emulsion coating of the second aqueous polymer emulsion to form at least one additional layer as a topcoat overlying the water-impermeable layer.

16. The method of claim 15, wherein the topcoat comprises a polymer material selected from the group consisting of polystyrene and epoxy resins.

17. A method for forming an absorbent structure for CO2 capture, the method comprising: providing a honeycomb substrate formed from a ceramic material and loaded with a sorbent material, the honeycomb substrate having porous partition walls that extend through the honeycomb substrate in an axial direction from an inlet surface of the honeycomb substrate to an outlet surface of the honeycomb substrate opposite the inlet surface, the porous partition walls having channel surfaces that define a plurality of individual channels, the plurality of individual channels comprising a plurality of reaction channels and a plurality of heat-exchange channels, whereby the channel surfaces of the reaction channels are reaction-channel surfaces and the channel surfaces of the heat-exchange channels are exchange-channel surfaces;
masking inlet ends and outlet ends of each of the reaction channels to form masked reaction channels; delivering a first aqueous polymer emulsion onto the inlet surface of the honeycomb substrate to cause the first aqueous polymer emulsion to flow through each of the heat-exchange channels and not to flow through the masked reaction channels, thereby forming a first emulsion coating of the first aqueous polymer emulsion over the exchange-channel surfaces only; and drying the emulsion coating to form a water-impermeable layer over the exchange-channel surfaces, wherein: the water-impermeable layer comprises a polymer material selected from the group consisting of poly(vinyl butyral) resins, polyacrylates, polynitriles, polychloroprenes, poly(vinyl chloride), poly(vinylidene fluoride), polyolefins, poly(tetrafluoroethylene), silicones, polyurethanes mixtures thereof, and composites thereof; and the polymer material of the water-impermeable layer penetrates into the porous partition walls that form the exchange-channel surfaces by less than 25% of a width of the porous partition walls.

18. The method of claim 17, wherein the aqueous polymer emulsion comprises uncured monomers that form the polymer material when cured or particles of the polymer material having a median particle size of from 0.1 μm to 20 μm.

19. The method of claim 17, further comprising:
   washcoating the honeycomb substrate with the sorbent material to load the honeycomb substrate with the sorbent material before delivering the first aqueous polymer emulsion.

20. The method of claim 17, further comprising:
   delivering a second aqueous polymer emulsion onto the inlet surface of the honeycomb substrate to cause the second aqueous polymer emulsion to flow through each of the heat-exchange channels and not to flow through the masked reaction channels, thereby forming a second emulsion coating of the second aqueous polymer emulsion over the water-impermeable layer; and
   drying the second emulsion coating of the second aqueous polymer emulsion to form at least one additional layer as a topcoat overlying the water-impermeable layer.

21. The absorbent structure of claim 1, wherein the porous partition walls have a porosity of from 35% to 60%.

\* \* \* \* \*